(12) United States Patent
Smith et al.

(10) Patent No.: US 9,652,033 B2
(45) Date of Patent: May 16, 2017

(54) MULTI-USER EYE TRACKING USING MULTIPLE DISPLAYS

(71) Applicant: Intel Corporation, Santa Clara, CA (US)

(72) Inventors: Ned M. Smith, Beaverton, OR (US); Vincent Weafer, Westlake Village, CA (US); Alan Krassowski, Santa Clara, CA (US); Carl Woodward, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/369,518

(22) PCT Filed: Dec. 19, 2013

(86) PCT No.: PCT/US2013/076514
§ 371 (c)(1),
(2) Date: Jun. 27, 2014

(87) PCT Pub. No.: WO2015/094276
PCT Pub. Date: Jun. 25, 2015

(65) Prior Publication Data
US 2016/0291689 A1    Oct. 6, 2016

(51) Int. Cl.
*G09G 5/00* (2006.01)
*G06F 3/01* (2006.01)
(Continued)

(52) U.S. Cl.
CPC .............. *G06F 3/013* (2013.01); *G06F 3/005* (2013.01); *G06F 3/01* (2013.01); *G06F 3/1423* (2013.01); *G06F 21/36* (2013.01); *G06F 21/84* (2013.01)

(58) Field of Classification Search
CPC ........................................................ G06F 3/013
(Continued)

(56) References Cited

U.S. PATENT DOCUMENTS 8,462,949 B2    6/2013  Anderson et al.
8,922,480 B1 *  12/2014 Freed ....................... G09G 5/00
                                                                345/156

(Continued)

FOREIGN PATENT DOCUMENTS

EP         2309307 A1       4/2011
WO      WO-02064031 A2      8/2002
WO     WO-2015094276 A1     6/2015

OTHER PUBLICATIONS

"International Application Serial No. PCT/US2013/076514, International Search Report mailed Sep. 26, 2014", 3 pgs.
(Continued)

*Primary Examiner* — Temesghen Ghebretinsae
*Assistant Examiner* — Hang Lin
(74) *Attorney, Agent, or Firm* — Schwegman Lundberg & Woessner, P.A.

(57) ABSTRACT

A system and method of securing data displayed to two or more individuals on two or more displays, wherein the two or more displays include a first display and a second display. One or more fixations of a first individual on the first display are determined. One or more fixations of a second individual on the second display are determined. A first frame buffer is associated with the first display. A second frame buffer is associated with the second display. Segments of the content in the first and second frame buffers are displayed while other segments are obfuscated.

20 Claims, 7 Drawing Sheets

(51) Int. Cl.
*G06F 21/36* (2013.01)
*G06F 21/84* (2013.01)
*G06F 3/00* (2006.01)
*G06F 3/14* (2006.01)

(58) Field of Classification Search
USPC .......................................... 348/14.01–14.16
See application file for complete search history.

(56) References Cited

U.S. PATENT DOCUMENTS

| | | | |
|---|---|---|---|
| 9,355,612 B1* | 5/2016 | Shepard | G09G 5/006 |
| 2009/0141895 A1 | 6/2009 | Anderson et al. | |
| 2012/0260307 A1 | 10/2012 | Sambamurthy et al. | |
| 2012/0326945 A1 | 12/2012 | Ellis et al. | |
| 2014/0101576 A1* | 4/2014 | Kwak | G06F 3/0482 |
| | | | 715/761 |

OTHER PUBLICATIONS

"International Application Serial No. PCT/US2013/076514, Written Opinion mailed Sep. 26, 2014", 5 pgs.

"Securing the Last 2 Feet of Classified Networks", Oculis Labs. Chameleon., [online]. Retrieved from the Internet: <URL: http://www.oculislabs.com/chameleon-3/>, (Accessed on Jan. 9, 2014), 2 pgs.

"Securing the Last 2 Feet: Protecting Classified Documents Against Visual Eavesdroppers", [Online]. Retrieved from the Internet: <URL: http://www.oculislabs.com/wp-content/uploads/2010/06/Oculis-Labs-Chameleon-whitepaper-public.pdf>, (Accessed: Dec. 22, 2014), 6 pgs.

"International Application Serial No. PCT/US2013/076514, International Preliminary Report on Patentability mailed Jun. 30, 2016", 7 pgs.

* cited by examiner

MULTI-USER EYE TRACKING USING MULTIPLE DISPLAYS

This application is a U.S. National Stage Application under 35 U.S.C 371 from International Application No. PCT/US2013/076514, filed on Dec. 19, 2013, which is hereby incorporated by reference in its entirety.

BACKGROUND ART

Users often use multiple display surfaces. With technologies such as Display as a Service (DaaS), the user has increased options for mixing and matching display surfaces with content delivery locally as well as remotely and with environments having multiple viewers. With DAAS, people can view what's on their tablet on a big-screen television, mirror the same imagery on multiple displays either locally or across the Internet, or link up multiple displays to create a single, bigger display. A challenge exists regarding displaying and sharing of sensitive content with a trusted party; given these environmental circumstances is it becomes easy for passers-by to observe shared sensitive content both from the content owner's display as well as from collaborators' displays.

Existing solutions offer eye tracking with display obfuscation solutions where a single display is protected using an eye tracking camera integrated with a graphics display controller that obfuscates the frame buffer content except in the areas of the screen where the viewer fixates. In some embodiments, the graphics controller displays non-obfuscated frame buffer information for the duration of the user fixation.

Working with multiple display surfaces can be challenging. What is needed is a system and method for displaying information to a second (or third) collaboration partner while also preventing eavesdropping by passers-by.

BRIEF DESCRIPTION OF THE DRAWINGS

Embodiments are illustrated by way of example, and not by way of limitation, in the figures of the accompanying drawings in which like reference numerals refer to similar elements.

DESCRIPTION OF THE EMBODIMENTS

Computer displays are the window into sensitive information stored on computer systems. Access control mechanisms are used to verify the identity of people accessing that information, but data being reviewed by qualified personnel is still subject to being seen by eavesdroppers looking over their shoulders. As noted above, obfuscation solutions have been used to limit the ability of a passer-by to look over the shoulder of qualified users on single displays, but no mechanism has been proposed for extending such capabilities to qualified observers on other displays.

Figure 1:
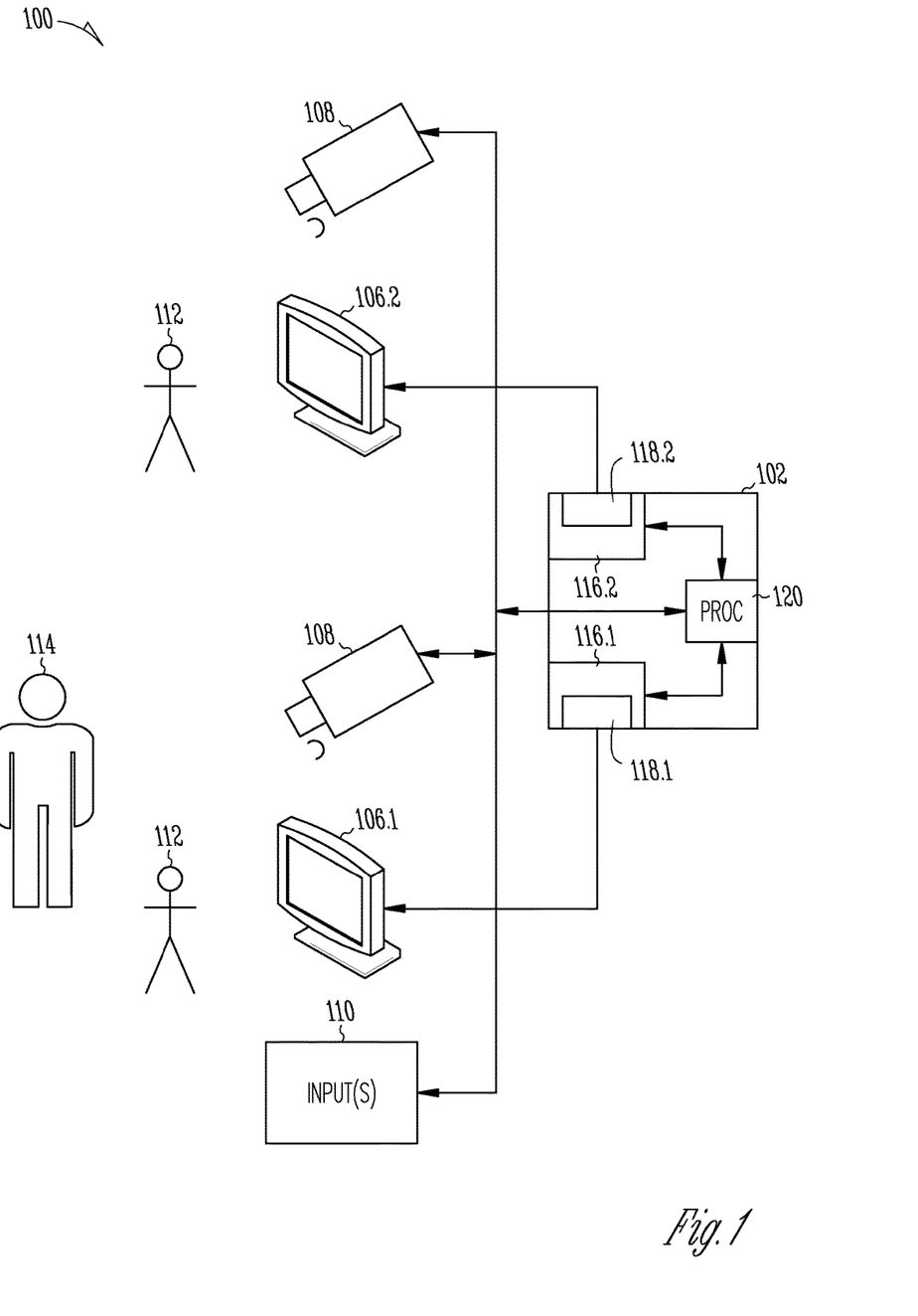
FIGS. 1 and 2 illustrate multi-user eye tracking systems.

FIG. 1 illustrates a multi-user eye tracking system 100. System 100 of FIG. 1 includes a computing system 102 connected to two or more displays 106.

Computer system 102 includes a processor 120 and two display controllers 116. Each display controller 116 includes a frame buffer 118 used to provide content to displays 106.

Adjacent to or integrated into each display 106 (such as display 106.1 and 106.2 in FIG. 1) is a camera 108 connected to a processor 120 in computer system 102. In some embodiments, an input device 110 (such as, for example, a keyboard or a mouse) is connected to processor 120 as well.

In some embodiments, information displayed on display 106.1 is mirrored on display 106.2, and obfuscation solutions are extended across displays 106.1 and 106.2 to prevent eavesdropping on either display 106. In one such embodiment, processor 120 transfers data from frame buffer 118.1 to frame buffer 118.2 to mirror the content of display 106.1 on display 106.2, while each display controller 118 includes obfuscation hardware or firmware to be able to obfuscate its associated display 106.

In the example embodiment shown in FIG. 1, cameras 108 connected to processor 120 are configured to track eye movements of users 112 viewing displays 106. In some such embodiments, processor 120 is configured to detect eavesdroppers 114 and to initiate obfuscation as necessary on the display 106 being viewed by eavesdropper 114.

Figure 2:
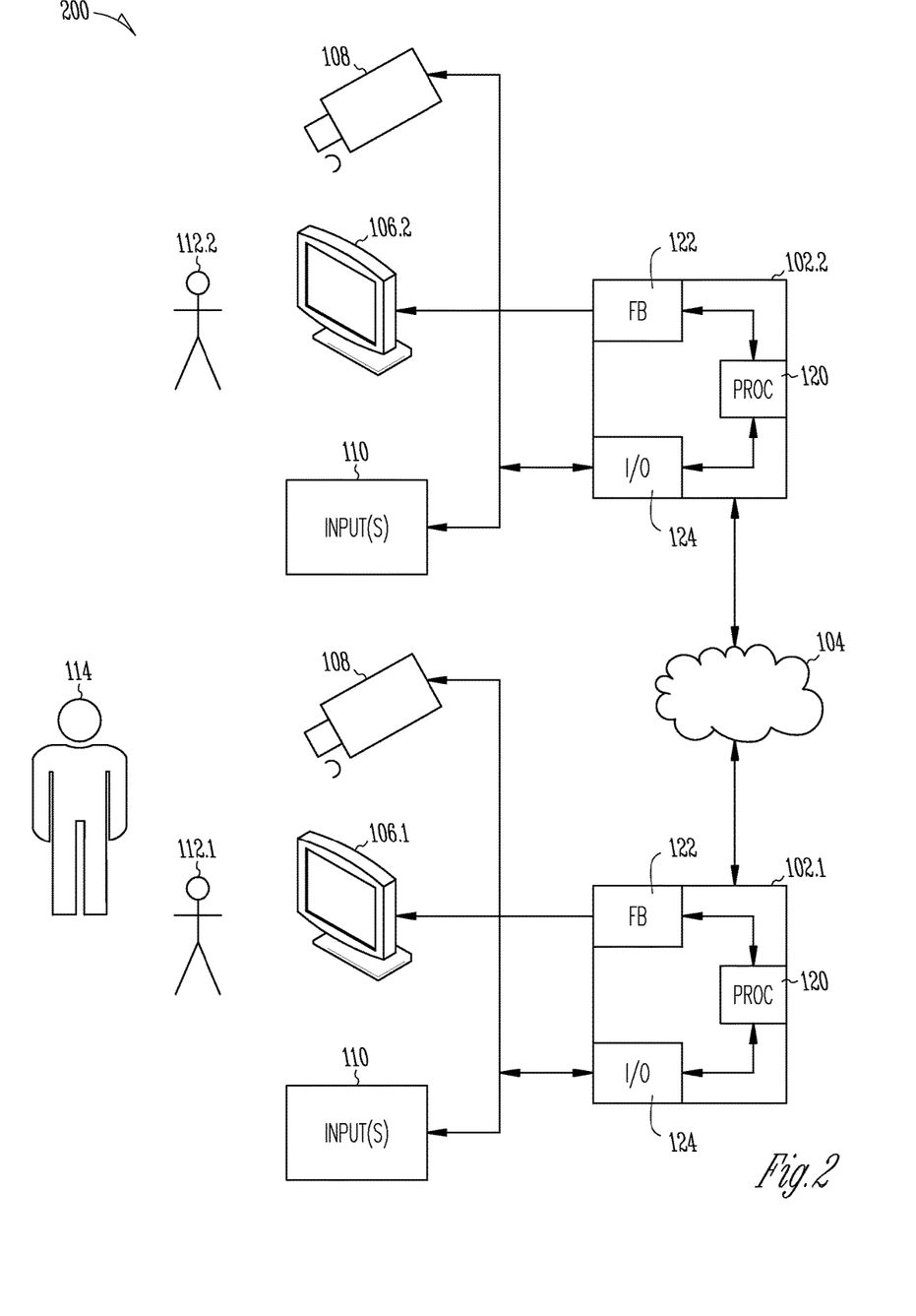

FIG. 2 illustrates another embodiment of a multi-user eye tracking system. In the example embodiment shown in FIG. 2, system 200 includes a computing system 102.1 connected to one or more displays 106.1, to one or more cameras 108 and, in some embodiments, to an input device 110. System 200 also includes a computer system 102.2 connected to one or more displays 106.2, to one or more cameras 108 and, in some embodiments, to an input device 110. Computer system 102.2 is also connected across a network 104 to computer system 102.1 and operates with displays 106.2 to provide remote replication of content displayed on displays 106.1. In some embodiments, network 104 is a local area network (LAN) while in other embodiments, network 104 is a wide area network (WAN) or a combination of LAN and WAN.

In the example shown in FIG. 2, cameras 108 are placed proximate to or are integrated into each display 106 so that they can track eye movement in people 112 observing the display 106. In some embodiments, information displayed on display 106.1 is mirrored on display 106.2, and obfuscation solutions are extended across displays 106.1 and 106.2 to prevent eavesdropping on either display 106.

In the example embodiment shown in FIG. 2, each computer system 102 includes a processor 120 connected to a frame buffer 122 and an I/O controller 124. Processor 120 writes data into frame buffer 122 for display on display 106. I/O controller 124 receives information from cameras 108 and inputs 110 for transfer to processor 120.

In some embodiments, systems 100 and 200 rely on an eye tracking mechanism that integrates eye movements from all qualified observers. Eye movements can be classified as "fixations"—momentary pauses in eye movements where the subject concentrates on the subject matter; and "saccades"—frequent and erratic eye movements that seem to scan the display area searching for interesting content to focus on. These movements appear to be random. In some embodiments, the intersection of fixations of the qualified observers is used by the graphics controller (such as display controller 116) to determine which frame data to obfuscate or de-obfuscate. By assigning a time-to-live timer to fixations of a leader (somewhat like the concept of the GUI window with focus), the follower participants' display frames will remain 'available' for display given the follower's natural rhythm for fixation and saccades. However, when the time-to-live timer expires, the follower sees obfuscated content implying the follower is 'wandering' away from content the leader intends the followers to view. This ensures the followers, though trusted, do not overly focus on content that possibly could be memorized if studied intently. Passers-by do not have the benefit of eye-tracking cameras following their eye movements and therefore are not able to synchronize their viewing pattern with that of the leader or any of the followers.

Working with multiple display surfaces can be challenging because eye tracking cameras can have narrow fields of view. Therefore, in some embodiments, multiple cameras 108 are used for each set of one or more displays 106 to increase field of view. Also, since user saccades and fixations occur in an apparent random ordering, in some embodiments, sensitive 3D camera technology is employed with eye tracking algorithms that follow the viewer's random eye movements.

In some such embodiments, 3D camera technology is embedded in the bezel of mass market displays 106 to solve the problem of insufficient numbers of cameras given multiple displays 106.

Figure 3:
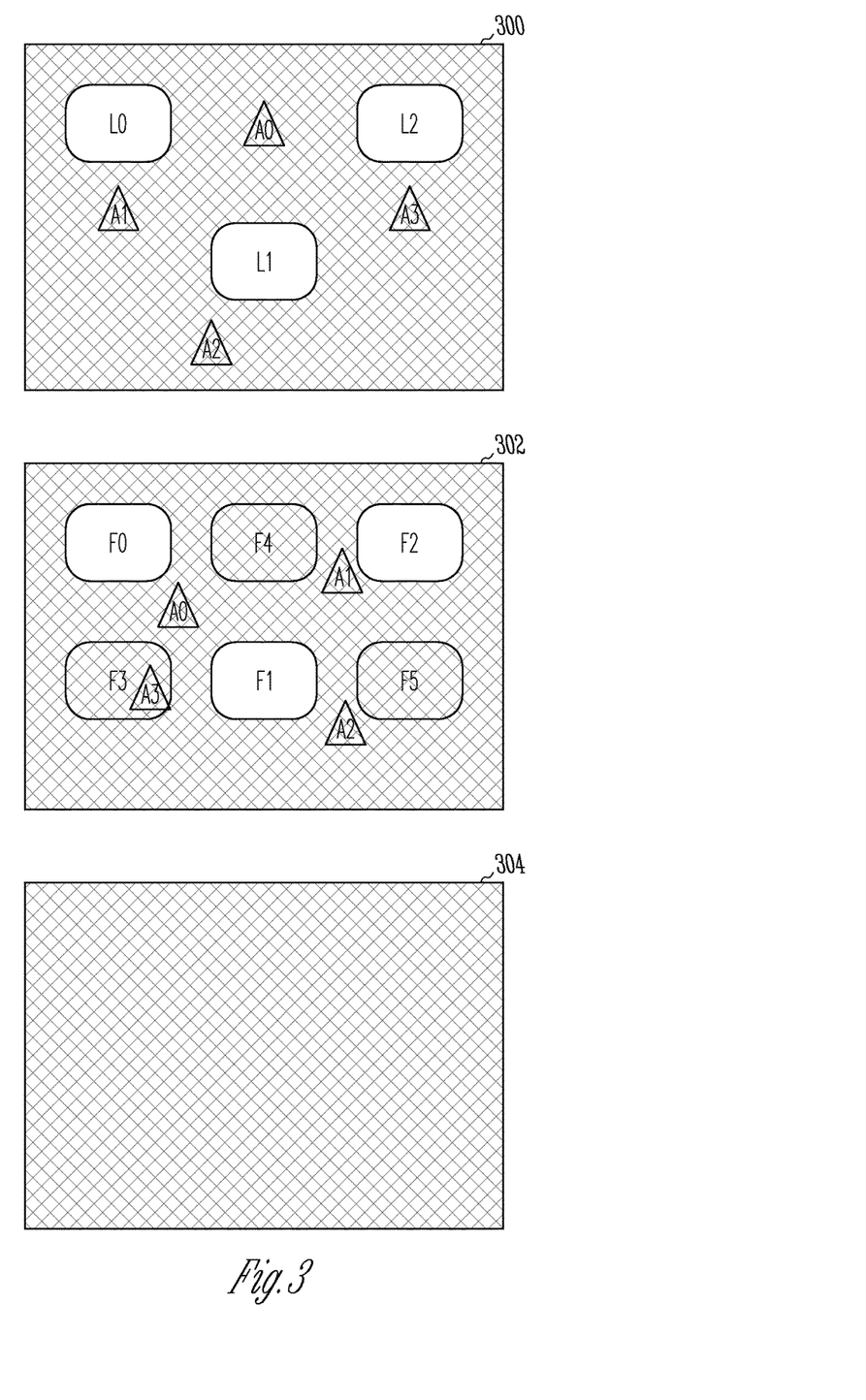
FIG. 3 illustrates displays within a multi-user eye tracking system.

Example display screens are shown in FIG. 3. In the example shown in FIG. 3, displays 300, 302, and 304 represent views of a display by a Leader (e.g., user 112.1 in FIG. 2), a Follower (e.g., user 112.2 in FIG. 2) and an Observer/Eavesdropper (114 in FIGS. 1 and 2), respectively. In the example shown, Leader fixations (L0, L1 and L2) determine the sections of the frame buffer that are not obfuscated in, for example, display 106.1 for the Leader. (The cross-hatching over the remainder of display 106.1 indicates that those areas of the display are being obfuscated.) In one embodiment, those same sections are presented without obfuscation to the Follower on display 106.2, but only when the Follower's fixations (F0, F1, F2, F3, F4 and F5) intersect with recent fixations of the Leader (at, for instance, as is shown in display screen 302 in FIG. 3, F0, F1 and F2). (The cross-hatching over F3, F4 and F5 in FIG. 3 indicates that those segments are being obfuscated. Once again, the cross-hatching over the remainder of display 106.2 indicates that those areas of the display are being obfuscated.)

In other embodiments, clear sections (L0, L1 and L2) presented to the Leader are only presented to the Follower when the Follower's fixations intersect with those of the Leader at approximately the same time. That is, when the Follower's eyes are looking at the same part of the display as the Leader. An example from FIG. 3 is when the Leader's eyes are on L1 at the same time that the Follower's eyes are on F1. In some embodiments, this is accomplished by setting the time-to-live timer to a small value.

In some embodiments, the content of the Leader's frame buffer is replicated in the frame buffer associated with display 106.2, and sections of the frame buffer are obfuscated as noted above. Fixations may vary but where they intersect with leader fixations they are visible in the Follower's frame buffer. In some embodiments, saccades (such as saccades A0-A3 in display screens 300 and 302) do not affect visible content.

Observer 114 eye movements are not tracked and, therefore, Observers 114 cannot easily glean content by observing either the Leader display 300 or the Follower display 302. Observer 114 therefore sees something like Observer display 304. That is, the entire display is, to his eyes, obfuscated whether it is display 106.1 or 106.2.

Figure 4:
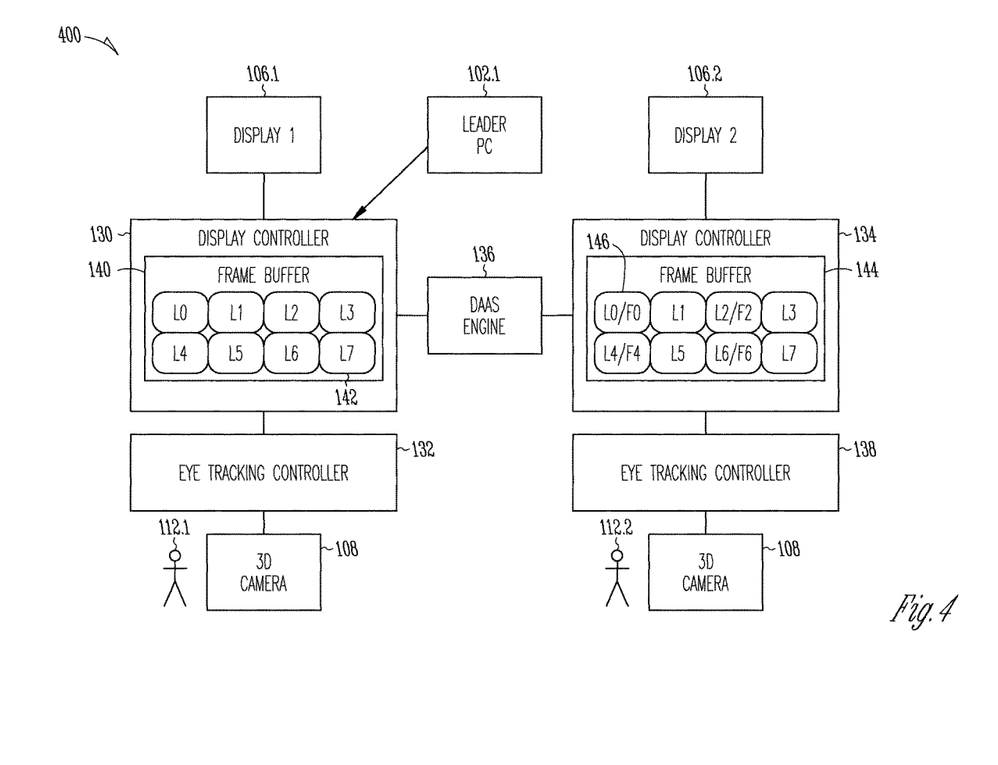
FIG. 4 illustrates another multi-user eye tracking system.

FIG. 4 illustrates another embodiment of a multi-user eye tracking system. In the example embodiment shown in FIG. 4, system 400 includes a computing system 102.1 connected to one or more displays 106.1 via a display controller 130. Display controller 130 includes a frame buffer 140 which stores data to be displayed on display 106.1. In some embodiments, display controller 130 and frame buffer 140 are integrated into computer system 102.1.

In some embodiments, computer system 102.1 is a personal computer. Other computing systems, such as a server or an embedded controller could be used for computing system 102.1 as well. In the embodiment shown in FIG. 4, an eye tracking controller 132 connected to one or more cameras 108 is used to determine the segments 142 of frame buffer 140 to obfuscate on display 106.1.

As shown in FIG. 4, system 400 also includes a display controller 134 connected to display controller 130 via a frame buffer transfer engine (such as DaaS engine 136). Display controller 134 includes a frame buffer 144 which stores data to be displayed on display 106.2. In some embodiments, DaaS engine 136 conveys some or all of the contents of frame buffer 140 to frame buffer 144 as needed.

In the embodiment shown in FIG. 4, an eye tracking controller 138 connected to one or more cameras 108 is used to determine the segments 146 of frame buffer 144 to obfuscate on display 106.2. Eye tracking controllers 132 and 138 can be implemented in firmware in cameras 108, in the corresponding computing systems 102, or on embedded controllers within, for instance, display controller 130 or display controller 134. In some example embodiments, eye tracking controllers are run in a trusted execution environment such as the Manageability Engine or the Security Engine, both available from Intel Corporation.

In some such embodiments, the content displayed is content replicated from frame buffer 140. In such cases, portions of content from frame buffer 140 are displayed without obfuscation when the Leader's eye movements and the Follower's eye movements fall within the same sections of their corresponding displays 106. For instance, as is shown on FIG. 4, when the Leader's eyes fall on L0 and the Follower's fall on F0, the segment 146 corresponding to F0 is displayed on display 106.2. In some such embodiments, there is some persistence built into the system such that when the Leader fixates on a new area (such as L1), the Follower is able to continue viewing F0 for a period of time. In some embodiments, that period of time is stored as a value (such as the time-to-live value discussed above).

In the embodiment shown, computer system 102.2 connected to one or more displays 106.2, to one or more cameras 108 and, in some embodiments, to an input device 110. Computer system 102.2 is also connected across a network 202 to computer system 102.1 and operates with displays 106.2 to provide remote replication of content displayed on displays 106.1.

In one embodiment, non-obfuscated frame buffer contents corresponding to Leader fixations are marked within the frame buffer 140 (at, for instance, L0). DaaS Engine 136 copies non-obfuscated frame buffer fixations (L0, L2, L4 and L6) to Follower display controller 134 where they are interleaved with Follower fixations (F0, F2, F4 and F6). In some embodiments, the intersection of Leader and Follower fixations determines the subsets of the frame buffer 144 that are not obfuscated.

In some embodiments, eye tracking controller 132 uses a 3D camera 108 (typically embedded in the bezel of the display) to view eye movements. Eye tracking controller 132 cooperates with display controller 130 to identify the subset of the display frame corresponding to the fixation regions. This computation is performed quickly (e.g., <1/60th second) so that the user does not perceive a blind spot or flicker. In some embodiments, frame buffer segments 142 not correlated with a fixation are obfuscated using a display buffer mask. In one embodiment, content is obfuscated by XOR'ing the mask into the display frame contents so that any observer who is not being tracked by eye tracking will not be able to observe meaningful content. In some embodiments, obfuscating includes replacing segments in the second display controller's frame buffer with random characters. In some embodiments, the obfuscation mechanism is embedded in the display controllers.

In some embodiments, a user 112.1 may employ multiple monitors 106 where the eye tracking for each display is tuned to that user 112.1. In some such embodiments, display controllers 130 and 134 cooperate to negotiate "fixation" frames corresponding to the appropriate display frames. For example, in a situation when user 112.1 has two displays 106, while user 112.2 has only a single display 106, when user turns from the first display 106 to the second display 106, the display 106 of user 112.2 automatically switches to display the contents of the second display of user 112.1. In one such embodiment, the non-obfuscated fixation frames can be shared with a trusted Follower using Display-as-a-Service (DaaS) engine 136 which distributes content to multiple displays/individuals. In one such embodiment, DaaS engine 136 relies on a content source—in this case Leader display controller 130. The DaaS engine 136 feeds leader frames to follower display controllers 134 where follower eye tracking controllers 138 identify fixation regions that overlap (intersect) the DaaS engine 136 supplied frames. In one embodiment, DaaS engine 136 assigns a time-to-live value to Leader frames and may expire those frames after the interval expires to prevent followers from focusing too much on frames not being observed by the leader. In this fashion, the leader can control what is being displayed to others simply by looking at the content he wants them to view.

It may be possible for an observer to use a camera, Google Glass™, or a video recording device to capture non-obfuscated screen content. Such a screen scraping attack still exists in systems 100, 200 and 400. To combat scraping attacks, in some embodiments eye tracking controllers 132 and 138 use observer detection methods; the methods allow individuals within the field of view of the display 106 to identify over-the-shoulder observers, observers wearing glasses or other electronic recording devices. In some such embodiments, Leaders and Followers are notified of such intrusions and given the option of blanking the screen until the environment is safer.

Figure 5A:
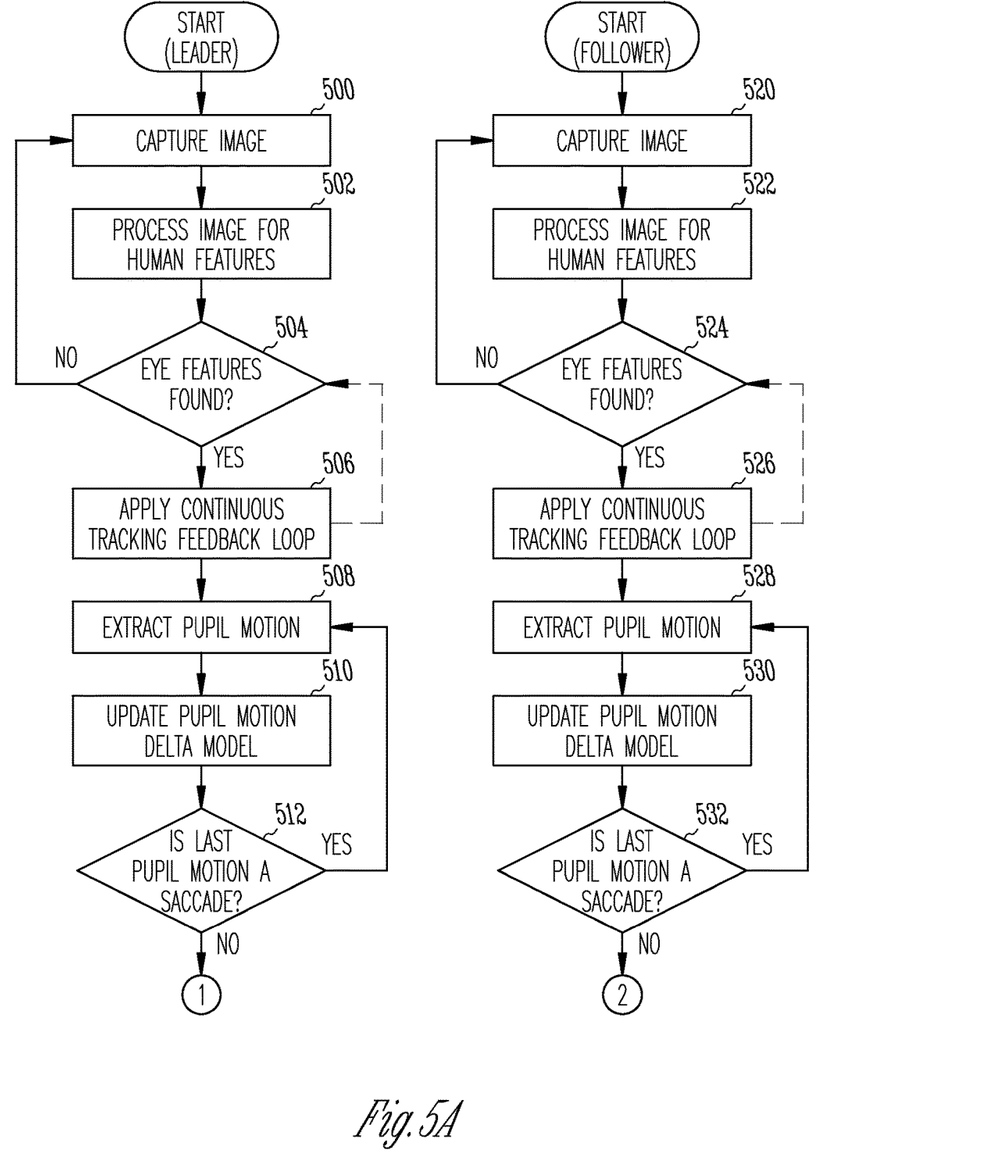
FIGS. 5a and 5b illustrate an example eye tracking method.

A method of eye tracking is shown in FIG. 5. In the example embodiment of FIG. 5, an image in front of Leader's display 106.1 is captured at 500 and processed at 502 for human features. If eye features are found at 504, control moves through 506 to 508. Otherwise, control moves back to 500. At 508, pupil motion is extracted and used, at 510, to update a pupil motion delta model.

A check is made at 512 to determine if the pupil motion was a saccade. If so, control moves back to 508. If, however, the check at 512 determines that the pupil motion was not a saccade, control moves to 514 and x, y, and z coordinates for eye features are fed to a display renderer. Leader frame buffer position is set at 516, and control moves to 540.

Frame buffers outside the view radius of display 106.1 are obfuscated at 540 and information regarding the areas viewable within the Leader's display 106.1 are captured at 542.

Figure 5B:
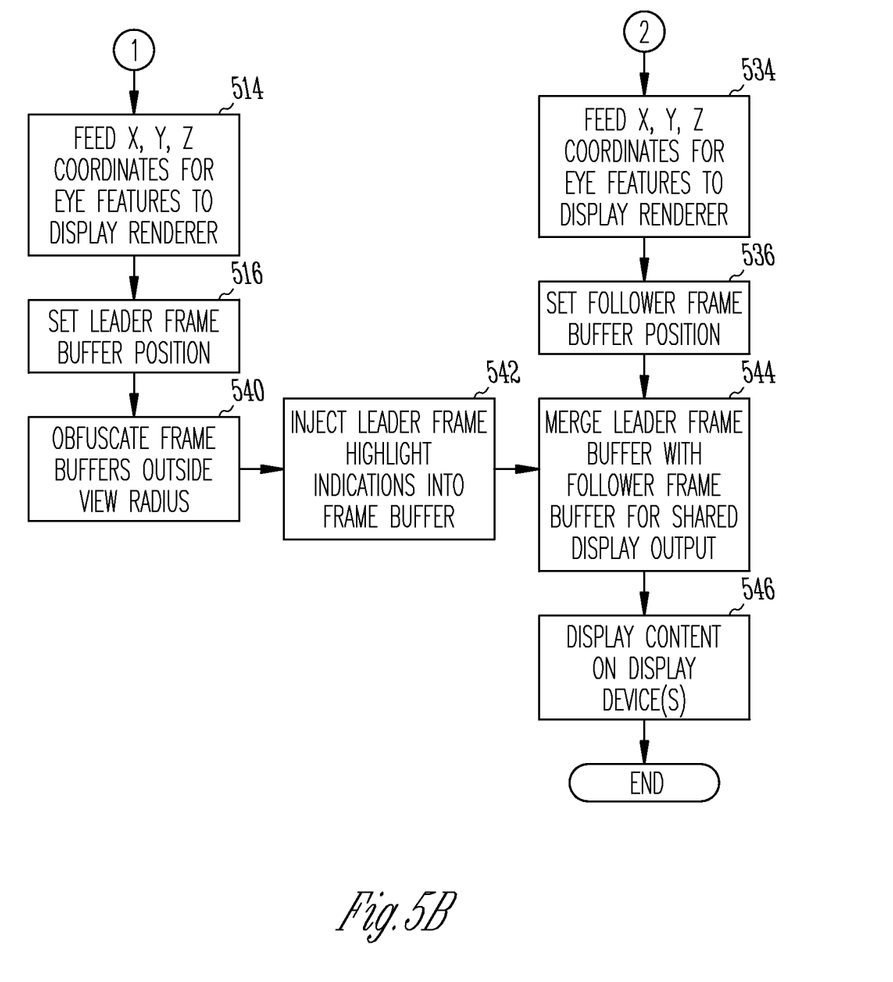

Meanwhile, an image in front of a Follower's display 106.2 is captured at 520 and processed at 522 for human features. If eye features are found at 524, control moves through 526 to 528. Otherwise, control moves back to 520. At 528, pupil motion is extracted and used, at 530, to update a pupil motion delta model.

A check is made at 532 to determine if the pupil motion was a saccade. If so, control moves back to 528. If, however, the check at 532 determines that the pupil motion was not a saccade, control moves to 534 and x, y, and z coordinates for eye features are fed to a display renderer. Follower frame buffer position is set at 536, and control moves to 544.

At 544, the leader frame buffer is merged with the follower frame buffer to form a shared output display and then the shared output display is displayed on display 106.2 at 546.

Figure 6:
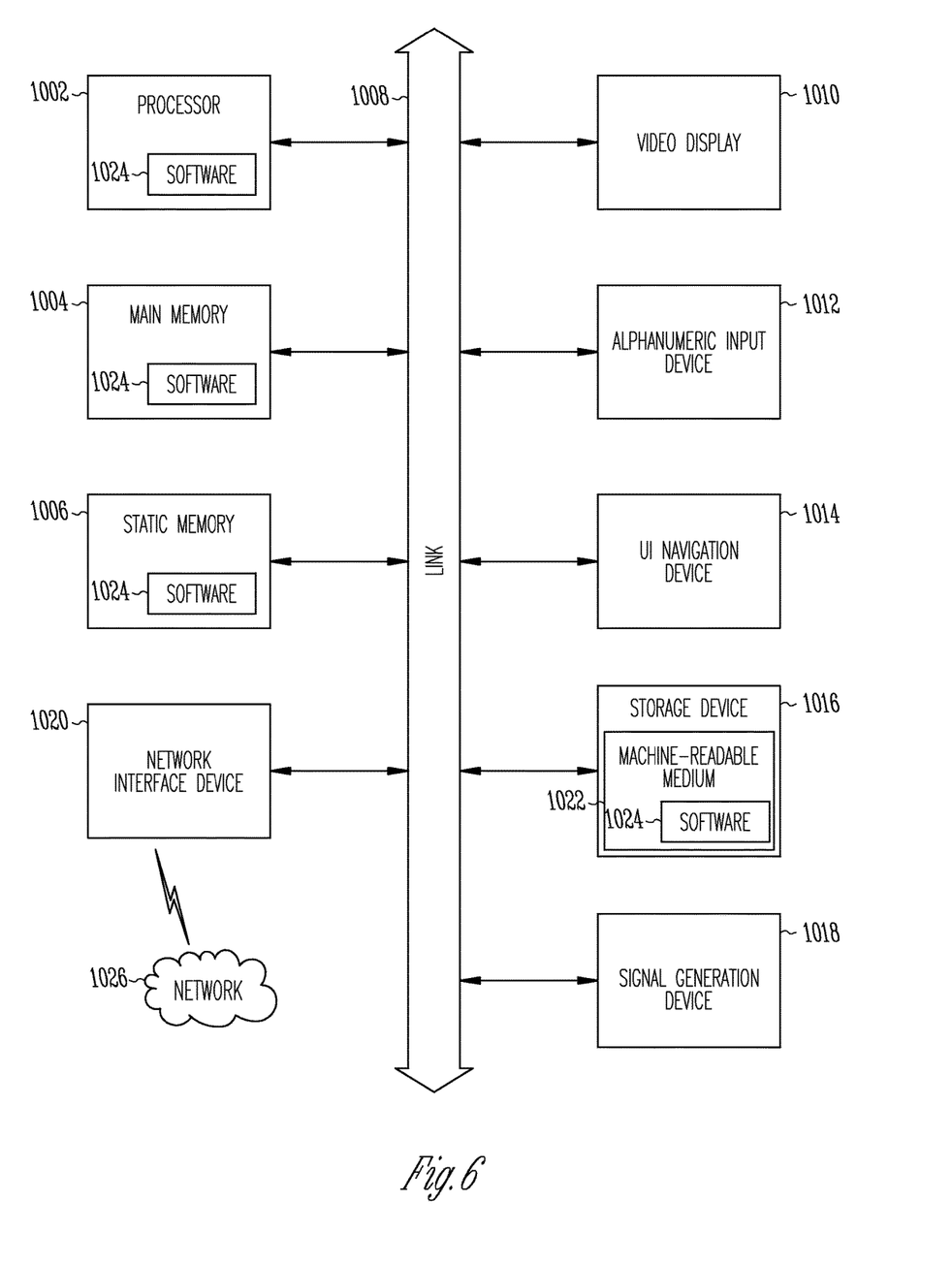
FIG. 6 is a block diagram illustrating an example machine upon which any one or more of the techniques (e.g., methodologies) discussed herein may perform, according to an example embodiment.

FIG. 6 is a block diagram illustrating a machine in the example form of a computer system 102, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a personal computer (PC), a tablet PC, a hybrid tablet, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 102 includes at least one processor 1002 (e.g., a central processing unit (CPU), a graphics processing unit (GPU) or both, processor cores, compute nodes, etc.), a main memory 1004 and a static memory 1006, which communicate with each other via a link 1008 (e.g., bus). The computer system 102 may further include a video display unit 1010, an alphanumeric input device 1012 (e.g., a keyboard), and a user interface (UI) navigation device 1014 (e.g., a mouse). In one embodiment, the video display unit 1010, input device 1012 and UI navigation device 1014 are incorporated into a touch screen display. The computer system 102 may additionally include a storage device 1016 (e.g., a drive unit), a signal generation device 1018 (e.g., a speaker), a network interface device 1020, and one or more sensors (not shown), such as a global positioning system (GPS) sensor, compass, accelerometer, or other sensor.

The storage device 1016 includes a machine-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004, static memory 1006, and/or within the processor 1002 during execution thereof by the computer system 102, with the main memory 1004, static memory 1006, and the processor 1002 also constituting machine-readable media.

While the machine-readable medium 1022 is illustrated in an example embodiment to be a single medium, the term "machine-readable medium" may include a single medium or multiple media (e.g., a centralized or distributed database, and/or associated caches and servers) that store the one or more instructions 1024. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1024 may further be transmitted or received over a communications network 1026 using a transmission medium via the network interface device 1020 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional Notes & Examples

Example 1 includes subject matter (such as a device, apparatus, or machine) for securing data displayed to two or more individuals on two or more displays, wherein the two or more displays include a first display and a second display, comprising determining one or more fixations of a first individual on the first display, determining one or more fixations of a second individual on the second display, associating a first frame buffer with the first display, associating a second frame buffer with the second display, displaying, on the first display, segments of the content in the first frame buffer corresponding to one or more of the fixations of the first individual on the first display while obfuscating other segments shown on the first display, and displaying, on the second display, segments of the content in the first frame buffer corresponding to one or more of the fixations of the second individual on the second display while obfuscating other segments of the first buffer being shown on the second display.

In Example 2, the subject matter of Example 1 may optionally include, determining intersections of fixations by the first individual on the first display with fixations of the second individual on the second display and displaying, on the second display, segments of the first frame buffer corresponding to the intersection of the fixations by the first individual on the first display with the fixations of the second individual on the second display.

In Example 3, the subject matter of Example 1 may optionally include, wherein obfuscating includes applying an XOR mask to segments of the frame buffer.

In Example 4, the subject matter of Example 1 may optionally include, wherein obfuscating includes replacing segments in the second display controller's frame buffer with random information.

In Example 5, the subject matter of Example 1 may optionally include, at least one machine readable medium comprising a plurality of instructions that in response to being executed on a computing device, cause the computing device to carry out a method according to the subject matter of any one of examples 1, 2, 3 or 4 above.

Example 6 includes an eye-tracking system, comprising first and second displays; a first camera placed to capture eye movements of a first individual watching the first display; a second camera placed to capture eye movements of a second individual watching the second display; a processor, wherein the processor determines one or more fixations of the first individual on the first display and one or more fixations of the second individual on the second display; a first display controller connected to the first display, wherein the first display controller includes a frame buffer having two or more segments, wherein the controller displays segments of the frame buffer corresponding to fixation locations determined for the first individual and obfuscates display of other segments of the frame buffer; and a second display controller connected to the second display, wherein the second display controller includes a frame buffer having two or more segments, wherein the second display controller displays segments of the second display controller's frame buffer corresponding to fixation locations determined for the first individuals on the first display and fixation locations determined for the second individuals on the second display and obfuscates display of other segments of the second display controller's frame buffer.

In Example 7, the subject matter of Example 6 may optionally include, wherein the processor copies content from the first display controller's frame buffer to the second display controller's frame buffer and wherein the second display controller displays segments of the second display controller's frame buffer corresponding to what the first individual is viewing on the first display.

In Example 8, the subject matter of Example 6 may optionally include, wherein the processor copies content from the first display controller's frame buffer to the second display controller's frame buffer and wherein the second display controller displays segments of the second display controller's frame buffer corresponding the second individual's fixations on the second display and corresponding to what the first individual is viewing on the first display.

In Example 9, the subject matter of any of Examples 6, 7 or 8 may optionally include, wherein obfuscating includes applying an XOR mask to segments of the frame buffer.

In Example 10, the subject matter of any of Examples 6, 7 or 8 may optionally include, wherein obfuscating includes replacing segments in the second display controller's frame buffer with random characters.

Example 11 includes an eye-tracking system, comprising first and second displays; a first camera placed to capture eye movements of a first individual watching the first display; a second camera placed to capture eye movements of a second individual watching the second display; a first processor, wherein the first processor determines one or more fixations of the first individual on the first display; a second processor which can be connected to the first processor, wherein the second processor determines one or more fixations of the second individual on the second display; a first display controller connected to the first display, wherein the first display controller includes a frame buffer having two or more segments, wherein the controller displays segments of the frame buffer corresponding to fixation locations determined for the first individual and obfuscates display of other segments of the frame buffer; and a second display controller connected to the second display, wherein the second display controller includes a frame buffer having two or more segments, wherein the second display controller displays, on the second display, segments of the second display controller's frame buffer corresponding to fixation locations determined for the first individuals on the first display and fixation locations determined for the second individuals on the second display and obfuscates display of other segments stored in the second display controller's frame buffer.

In Example 12, the subject matter of Example 11 may optionally include, wherein the second processor copies content from the first display controller's frame buffer to the second display controller's frame buffer and wherein the second display controller displays segments of the second display controller's frame buffer corresponding to what the first individual is viewing on the first display.

In Example 13, the subject matter of Example 11 may optionally include, wherein the second processor copies content from the first display controller's frame buffer to the second display controller's frame buffer and wherein the second display controller displays segments of the second display controller's frame buffer corresponding the second individual's fixations on the second display and corresponding to what the first individual is viewing on the first display.

In Example 14, the subject matter of any of Examples 11, 12 or 13 may optionally include, wherein obfuscating includes applying an XOR mask to segments of the frame buffer.

In Example 15, the subject matter of any of Examples 11, 12 or 13 may optionally include, wherein obfuscating includes replacing segments in the second display controller's frame buffer with random information.

In Example 16, the subject matter of Example 11 may optionally include, wherein the second processor and the first processor cooperate to form a Display as a Service (DaaS) engine, wherein the DaaS engine copies content from the first display controller's frame buffer to the second display controller's frame buffer.

Example 17 includes an eye-tracking system, comprising first and second displays; a first camera placed to capture eye movements of a first individual watching the first display; a second camera placed to capture eye movements of a second individual watching the second display; a first eye tracking controller connected to the first camera, wherein the first eye tracking controller determines one or more fixations of the first individual on the first display; a second eye tracking controller connected to the second camera, wherein the second processor determines one or more fixations of the second individual on the second display; a first display controller connected to the first display, wherein the first display controller includes a frame buffer having two or more segments, wherein the controller displays segments of the frame buffer corresponding to fixation locations determined for the first individual and obfuscates display of other segments of the frame buffer; a second display controller connected to the second display, wherein the second display controller includes a frame buffer having two or more segments, wherein the second display controller displays, on the second display, segments of the second display controller's frame buffer corresponding to fixation locations determined for the first individual on the first display and obfuscates display of other segments stored in the second display controller's frame buffer; and a frame buffer transfer engine, wherein the frame buffer transfer engine copies content from the first display controller's frame buffer to the second display controller's frame buffer and wherein the second display controller displays segments of the second display controller's frame buffer corresponding to what the first individual is viewing on the first display.

In Example 18, the subject matter of Example 17 may optionally include, wherein the second processor copies content from the first display controller's frame buffer to the second display controller's frame buffer and wherein the second display controller displays segments of the second display controller's frame buffer corresponding the second individual's fixations on the second display and corresponding to what the first individual is viewing on the first display.

In Example 19, the subject matter of Examples 17 or 18 may optionally include, wherein obfuscating includes applying an XOR mask to segments of the frame buffer.

In Example 20, the subject matter of Examples 17 or 18 may optionally include, obfuscating includes replacing segments in the second display controller's frame buffer with random information.

In Example 21, the subject matter of Example 17 may optionally include, wherein the frame buffer transfer engine includes a DaaS engine, wherein the DaaS engine copies content from the first display controller's frame buffer to the second display controller's frame buffer.

In Example 22, the subject matter of Examples 17, 18 or 21 may optionally include, wherein segments that are not obfuscated remain that way for a defined period of time after the first individual stops fixating on that segment.

Example 23 includes an eye-tracking system, comprising a first display; a first camera system placed to capture eye movements of a first individual watching the first display; a first eye tracking controller connected to the first camera, wherein the first eye tracking controller determines one or more fixations of the first individual on the first display; a display controller connected to the first display, wherein the display controller includes a frame buffer having two or more segments, wherein the display controller is capable of receiving frame buffer information from a different eye tracking system and of displaying the received frame buffer information on the first display, wherein displaying includes displaying segments of the frame buffer information corresponding to fixation locations determined for a second individual on a different display and obfuscating display of other segments of the received frame buffer information.

In Example 24, the subject matter of Example 23 may optionally include, wherein displaying segments includes obfuscating segments where there is insufficient overlap between the fixations of the first and second individuals on the first and second displays, respectively.

Example 25 includes subject matter (such as a device, apparatus, or machine) for securing data displayed to two or more individuals on two or more displays, wherein the two or more displays include a first display and a second display, the method comprising determining one or more fixations of a first individual on the first display; determining one or more fixations of a second individual on the second display; associating a first frame buffer with the first display; associating a second frame buffer with the second display; copying content from the first frame buffer to the second frame buffer; displaying, on the first display, segments of the content in the first frame buffer corresponding to one or more of the fixations of the first individual on the first display while obfuscating other segments shown on the first display; and displaying, on the second display, segments of the content in the first frame buffer corresponding to one or more of the fixations of the second individual on the second display while obfuscating other segments of the first buffer being shown on the second display.

In Example 26, the subject matter of Example 25 may optionally include wherein displaying on the second display includes determining intersections of fixations by the first individual on the first display with fixations of the second individual on the second display; and displaying, on the second display, segments of the first frame buffer corresponding to the intersection of the fixations by the first individual on the first display with the fixations of the second individual on the second display.

In Example 27, the subject matter of Example 25 may optionally include, wherein obfuscating includes applying an XOR mask to segments of the frame buffer.

In Example 28, the subject matter of Example 25 may optionally include, wherein obfuscating includes replacing segments in the second display controller's frame buffer with random information.

Example 29 includes subject matter (such as a device, apparatus, or machine) for obfuscating data, comprising capturing eye movements of a first individual watching a first display; determining one or more fixations of the first individual on the first display; receiving frame buffer information from an external source; and displaying the received frame buffer information on the first display, wherein displaying includes displaying segments of the frame buffer information corresponding to fixation locations determined for a second individual on a different display and obfuscating display of other segments of the received frame buffer information.

In Example 30, the subject matter of Example 29 may optionally include, wherein displaying segments includes obfuscating segments where there is insufficient overlap between the fixations of the first and second individuals on the first and second displays, respectively.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described.

Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. A method of securing data displayed to two or more individuals on two or more displays, wherein the two or more displays include a first display and a second display, the method comprising:
   determining one or more eye fixations of a first individual to an area of the first display;
   determining one or more eye fixations of a second individual to an area of the second display; associating a first frame buffer with the first display, the first frame buffer having content; associating a second frame buffer with the second display; displaying, on the first display, segments of the content in the first frame buffer corresponding to one or more of the eye fixations of the first individual to the area of the first display while obfuscating other segments shown on the first display, displaying, on the second display, segments of the content in the first frame buffer corresponding to one or more of the eye fixations of the second individual to the area of the second display while obfuscating other segments of the first frame buffer being shown on the second display,
   determining intersections of eye fixations by the first individual on the first display with eye fixations of the second individual on the second display; and
   displaying, on the second display, segments of the content in the first frame buffer corresponding to the intersection of the eye fixations by the first individual to the area of the first display with the eye fixations of the second individual to the area of the second display.

2. The method of claim 1, wherein obfuscating includes applying an XOR mask to segments of the first frame buffer.

3. The method of claim 1, wherein obfuscating includes replacing segments in the second frame buffer with random information.

4. The method of claim 1, wherein displaying on the second display includes copying content from the first frame buffer to the second frame buffer.

5. At least one non-transitory machine readable medium comprising a plurality of instructions that in response to being executed on a computing device, cause the computing device to carry out a method according to claim 1.

6. An eye-tracking system arranged to perform the method of claim 1.

7. An apparatus comprising means for performing the method of claim 1.

8. An eye-tracking system, comprising:
first and second displays,
a first camera placed to capture eye movements of a first individual watching the first display;
a second camera placed to capture eye movements of a second individual watching the second display;
processor means for determining one or more eye fixations of the first individual to an area of the first display and one or more eye fixations of the second individual to an area of the second display,
a first display controller connected to the first display, wherein the first display controller includes a first frame buffer having two or more segments, wherein the first display controller displays segments of the first frame buffer corresponding to eye fixation locations determined for the first individual and obfuscates display of other segments of the first frame buffer; and
a second display controller connected to the second display, wherein the second display controller includes a second frame buffer having two or more segments, wherein the second display controller displays segments of the second frame buffer corresponding to eye fixation locations determined for the first individual to the area of the first display and eye fixation locations determined for the second individual to the area of the second display and obfuscates display of other segments of the second frame buffer.

9. The system of claim 8, wherein the processor means copies content from the first-frame buffer to the second frame buffer and wherein the second display controller displays segments of the second frame buffer corresponding to what the first individual is viewing on the first display.

10. The system of claim 8, wherein the processor means copies content from the first frame buffer to the second frame buffer and wherein the second display controller displays segments of the second frame buffer corresponding the second individual's fixations on the second display and corresponding to what the first individual is viewing on the first display.

11. The system of claim 8, wherein the processor means includes a processor, wherein the processor determines one or more eye fixations of the first individual to the area of the first display and one or more eye fixations of the second individual to the area of the second display.

12. The system of claim 8, wherein the processor means includes a first processor and a second processor, wherein the first processor determines one or more eye fixations of the first individual to the area of the first display and wherein the second processor determines one or more eye fixations of the second individual to the area of the second display.

13. The system of claim 12, wherein the second processor and the first processor cooperate to form a Display as a Service (DaaS) engine, wherein the DaaS engine copies content from the first frame buffer to the second frame buffer.

14. The system of claim 8, wherein obfuscating includes applying an XOR mask to segments of the second frame buffer.

15. The system of claim 8, wherein obfuscating includes replacing segments in the second frame buffer with random characters.

16. The system of claim 8, wherein the system further includes a frame buffer transfer engine, wherein the frame buffer transfer engine copies content from the first frame buffer to the second frame buffer and wherein the second display controller displays segments of the second frame buffer corresponding to what the first individual is viewing on the first display.

17. The system of claim 8, wherein segments that are not obfuscated when displayed remain that way for a defined period of time after the first individual stops fixating on that segment.

18. A device, comprising:
a first display;
a first camera system placed to capture eye movements of a first individual watching the first display;
a first eye tracking controller connected to the first camera, wherein the first eye tracking controller determines one or more eye fixations of the first individual to an area of the first display;
a display controller connected to the first display, wherein the display controller includes a first frame buffer having two or more segments, wherein the display controller is capable of receiving frame buffer information from a different eye tracking system and also capable of displaying the received frame buffer information on the first display, wherein displaying includes displaying segments of the first frame buffer information corresponding to eye fixation locations determined for a second individual to an area of a second display and obfuscating display of other segments of the received frame buffer information.

19. The device of claim 18, wherein displaying segments includes obfuscating segments where there is insufficient overlap between the eye fixations of the first and second individuals of the areas of the first and second displays, respectively.

20. The device of claim 18, wherein segments that are not obfuscated when displayed remain that way for a defined period of time after the first individual stops fixating on that segment.

* * * * *

UNITED STATES PATENT AND TRADEMARK OFFICE
CERTIFICATE OF CORRECTION

PATENT NO. : 9,652,033 B2 Page 1 of 1
APPLICATION NO. : 14/369518
DATED : May 16, 2017
INVENTOR(S) : Smith et al.

It is certified that error appears in the above-identified patent and that said Letters Patent is hereby corrected as shown below:

In the Claims

In Column 12, Line 44, in Claim 1, after "display;", insert --¶--

In Column 12, Line 46, in Claim 1, after "content;", insert --¶--

In Column 12, Line 47, in Claim 1, after "display;", insert --¶--

In Column 12, Line 51, in Claim 1, delete "display," and insert --display;¶-- therefor In Column 12, Line 57, in Claim 1, delete "display," and insert --display;-- therefor In Column 13, Line 16, in Claim 8, delete "displays," and insert --displays;-- therefor In Column 13, Line 21, in Claim 8, delete "eve" and insert --eye-- therefor In Column 13, Line 23, in Claim 8, delete "eve" and insert --eye-- therefor In Column 13, Line 24, in Claim 8, delete "display," and insert --display;-- therefor In Column 13, Line 43, in Claim 9, delete "first-frame" and insert --first frame-- therefor Signed and Sealed this
Thirty-first Day of July, 2018

Andrei Iancu
*Director of the United States Patent and Trademark Office*